United States Patent [19]

Hesthamer et al.

[11] Patent Number: 5,020,378
[45] Date of Patent: Jun. 4, 1991

[54] DEVICE FOR NON-CONTACT MEASURING OF STRESSES IN A BAR-SHAPED BODY

[75] Inventors: Tore Hesthamer; Carl Tyren, both of Lund, Sweden

[73] Assignee: AB SKF, Gothenburg, Sweden

[21] Appl. No.: 469,506

[22] PCT Filed: Sep. 1, 1988

[86] PCT No.: PCT/SE88/00447
§ 371 Date: Mar. 1, 1990
§ 102(e) Date: Mar. 1, 1990

[87] PCT Pub. No.: WO89/02070
PCT Pub. Date: Mar. 9, 1989

[30] Foreign Application Priority Data
Sep. 3, 1987 [SE] Sweden ................................ 8703418

[51] Int. Cl.$^5$ .......................... G01B 7/24; G01L 5/16
[52] U.S. Cl. .................... 73/779; 73/862.04; 73/DIG. 2; 324/209
[58] Field of Search ........... 73/862.04, 862.36, 862.69, 73/779, DIG. 2

[56] References Cited

U.S. PATENT DOCUMENTS 4,414,855 11/1983 Iwasaki ........................ 73/862.36

FOREIGN PATENT DOCUMENTS 0102530 5/1986 Japan ................................ 73/862.36
0258132 11/1986 Japan ................................ 73/862.36

Primary Examiner—Charles A. Ruehl
Attorney, Agent, or Firm—Eugene E. Renz, Jr.

[57] ABSTRACT

The invention relates to a device for non-contact measuring of stresses including bending stresses in a bar-shaped body (1), e.g. a cylindrical bar, shaft or the like. In at least one transverse zone (2, 3) the bar (1) is provided with a number of thin strips (4) of an amorphous magnetoelastic material, distributed along the circumference of the zone, said strips (4) being affixed to the circumferential surface of the zone and extending at a pitch angle therealong, a preferably at a pitch angle of 45°. Means (5) are provided for generating a magnetic field over said zone (2, 3) and a pick up coil (6-13) encircling the bar is provided for each zone (2, 3), said pick up coil being connected to a measuring unit (16, 16A) for indicating signals generated in the coil. According to the invention each pick up coil (6-13) encircling the bar (1), which is associated with a strip zone (2, 3), is oriented in relation to the bar (1) in such a manner that the magnetosensitive axis of the pick up coil includes an acute angle, preferably an angle of 45°, with the axis of the bar (1) in the strip zone.

6 Claims, 4 Drawing Sheets

DEVICE FOR NON-CONTACT MEASURING OF STRESSES IN A BAR-SHAPED BODY

The present invention relates to a device for non-contact measuring of stresses in a bar-shaped body, e.g. a cylindrical bar, shaft or the like.

In many different technical areas it is desired to be able to measure during operation without contact the stresses to which a structural element, e.g. a shaft, a tool or the like, is exposed during the use thereof in order to be able to control in dependence on the measuring values obtained, e.g. feed rate, drive power supplied etc, in order to prevent that the structural element or an element cooperating therewith or a workpiece actuated by the structural element is damaged or exposed to non-desirable stresses.

According to one prior art device for non-contact measuring of torsion stresses in shafts, drills or other bar-shaped bodies, the bar is provided in two axially spaced zones with a number of thin strips of an amorphous magnetoelastic material, uniformly distributed in the circumferential direction in the related zone. The strips are affixed to the circumferential surface of the related zone at a pitch of substantially 45°, the pitch direction in one zone being opposite to the pitch direction in the other zone. The bar is encircled by stationary pick-up coils having equal numbers of winding turns, which are provided for each zone, each pick-up coil extending in a plane which is perpendicular to the axis of the bar, as well as an outer stationary excitation coil encircling the zones with strips and also the pick-up coils and extending axially in relation to the axis of the bar. The excitation coil can be connected to a drive unit for generating a magnetic field over the strip zones and the pick-up coils, and the pick-up coils are connected to a measuring unit for indicating signals generated in the pick-up coils. The device is based on the known condition that the magnetic properties of amorphous magnetoelastic materials are changed in dependence on the stress condition of the material. Thus, the strips affixed to the bar are exposed to stresses when the bar is exposed to stresses. When a magnetic field is applied over the pick-up coils and the zones with strips a current will be induced in the pick-up coils which are actuated by the strips of amorphous magnetoelastic material located inwardly of the coils. The output signal from the pick-up coils accordingly depends on the magnetic properties of the strips and since these properties will be changed in dependence on the mechanical stress condition of the strips, the output signals from the pick-up coils will represent the stresses existing in the bar. The pick-up coils for the two zones with strips are connected in series in opposition. When the bar is not exposed to load there will thus be obtained a resulting zero output signal. If the bar is exposed to torsion stress there will be obtained an output signal which depends on the magnitude of the torsion stress as well as the direction of the torque.

A drawback of the prior art device described above is that it can be utilized only for measuring torsion stresses but does not allow e.g. bending stresses or axial stresses, for which the bar may be exposed, to be measured. Bending stresses to which the bar is exposed thus will generate no resulting output signal in the pick-up coils. If the bar is exposed to axial stress also the zero output signal will be obtained.

Another drawback of the prior art device is that the strength of the signals obtained from the pick-up coils is relatively low due to the fact that the strips of amorphous magnetoelastic material do not extend perpendicularly to the planes of the pick-up coils; they include an angle with these planes. As a consequence thereof the prior art device is relatively sensitive to axial displacement of the bar in relation to the coils.

According to another prior art torque meter which in a corresponding manner as has been described above comprises two zones having strips of a thin amorphous magnetoelastic material the two pick-up coils encircling the bar are replaced by two pick-up heads each consisting of a U-shaped iron core provided with a coil. The pick up heads are located in proximity of the surface inclined 45° to the axis of the shaft, said heads being spaced 90°. The coils of the pick-up heads are connected in series in opposition. When the bar is not exposed to a load the resulting zero output signal accordingly will be obtained. If the bar is exposed to a torsion stress an output signal will be obtained which depends on the magnitude of the torsion stress as well as the direction of the torque.

Also this device has the disadvantage that it is possible to measure torsion stresses only while bending stresses and/or axial stresses in the bar generate a zero signal.

Another severe drawback of said latter prior art device is that the pick-up heads which are used are very sensitive to variations in the gap between the pick-up heads and the bar surface. As a consequence thereof the device is very sensitive to variations in the radial dimensions of the bar and to radial movements of the bar during the measuring procedure.

The purpose of the present invention is to provide a device of the kind referred to above wherein thin strips of an amorphous magnetoelastic material are used, which are affixed to the surface of the object to be measured, stresses causing changes in the mechanical stress condition and thus the magnetic properties of the strips being detected by means of pick-up coils encircling the measurement object in the zone or the zones wherein said strips are located. The device makes possible to measure without contact torsion stresses and bending stresses as well as axial stresses, and the signal strength at measuring will be greater than in case of the prior art devices, which contributes to increased reliability at the measuring and reduced sensitivity to disturbances. It is also a purpose of the invention to provide a device which makes possible to measure stresses without contact by utilizing pick-up coils encircling the object to be measured and which to a considerably less extent is sensitive to disturbances caused by movement of the object during measuring.

An important purpose of the invention is to provide a device of the kind referred to above which does not only allow measuring of stresses irrespective of the stresses being caused by twisting, bending or axial force, but also allows distinction between the several stresses.

The purposes mentioned above are achieved by an embodiment according to the subsequent claims.

The invention will be described below reference being made to the diagrammatic illustrative embodiments shown in the accompanying drawings.

Figure 1:
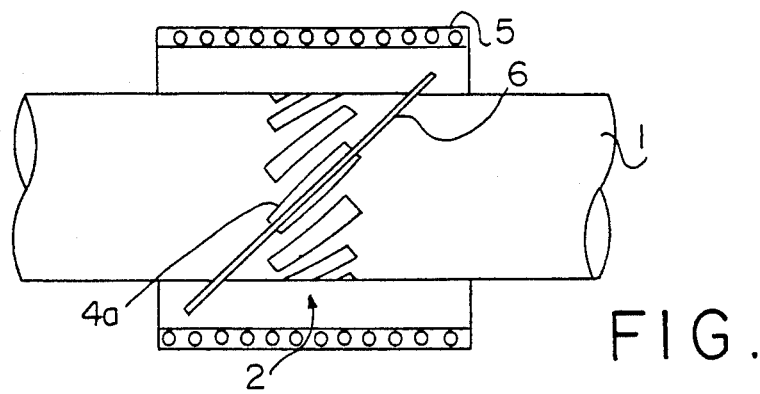
FIG. 1 shows diagrammatically a device of the invention in the simplest embodiment thereof for non-contact measuring of stresses in a circular-cylindrical bar-shaped body.
Figure 1A:
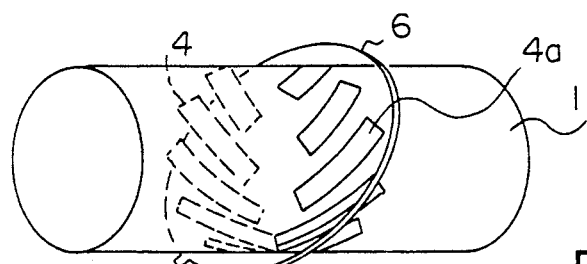
FIG. 1A is a perspective view of the bar shaped circular-cylindrical body shown in FIG. 1, which is provided in a zone with amorphous strips, and the pick-up coil encircling the bar.

In FIGS. 1 and 1A there is shown diagrammatically an illustrative embodiment wherein the device of the invention is utilized for measuring the stresses in a circular-cylindrical bar 1. In a zone 2 the bar 1 is provided with a number of thin strips 4 of an amorphous magnetoelastic material, which are uniformly distributed along the circumference in the peripheral direction. The strips 4 are affixed to the peripheral surface of the bar 1 by glueing, welding or a corresponding attachment method. The strips 4 can also be sputtered to the surface of the bar 1. The strips 4 extend along the periphery at a pitch the pitch angle of which is substantially 45°. A pick-up coil 6 is associated with the zone 2 and is stationarily mounted outside the bar 1 and encircles said bar. The pick-up coil 6 extends in a plane which includes about 45° with the axis of the bar 1. In the rotational position of the bar 1 shown in the figure a strip 4 on the bar extends substantially perpendicularly to the plane of the coil 6, the strip which is diametrically opposite to said strip extending substantially in the plane of the coil. Since the strips are affixed to a circular-cylindrical surface each strip in the longitudinal direction thereof follows a helical line, which means that the strip does not over the whole length thereof extend in the plane of the pick-up coil 6 or perpendicularly to said plane, respectively, but since the strips are short in relation to the diameter of the bar the deviation towards the ends of the strip is sufficiently small so as not to affect the result to any appreciable extent. The strip 4 which thus can be considered as extending perpendicularly to the plane of the pick-up coil 6 influences the current in the pick-up coil while the strip extending in the plane of the coil provides no influence.

Outside the bar 1 an excitation coil 5 is stationarily mounted, which extends axially in relation to the bar 1 and encircles the strip zone 2 as well as the pick-up coil 6 The excitation coil 5 can be connected to a drive unit not shown in the figure for generating a magnetic field over the pick-up coil and the strip zone. The pick-up coil 6 is connected to a measuring unit not shown in the figure for indicating the signals generated in the pick-up coil.

If the excitation coil 5 is operated to generate a magnetic field over the pick-up coil 6 and the strip zone 2, a current will be induced in the first place in the pick-up coil 6 under the influence of the amorphous magnetoelastic strip 4 located in the operational area of the coil and extending substantially in parallel with the magnetosensitive axis of the pick-up coil. The magnetosensitive axis of the coil refers to the direction through the coil wherein a magnetic flux will generate the greatest tension in the coil. In the example shown in FIG. 1 the magnetosensitive axis extends perpendicularly to the plane of the coil 6. The diametrically opposite strip 4 extending in a detection plane perpendicular to the magnetosensitive axis of the coil, i.e. in the plane of the coil 6 in the example shown in FIG. 1, provides no influence on the coil. When the bar is exposed to no load there will accordingly be obtained a signal in the coil, which depends on the magnetic properties of the amorphous strip of magnetoelastic material.

If the bar 1 is exposed to a torque there will be obtained a stress in the bar, which provides elongation or compression of the bar surface. The amorphous strips affixed to the surface of the bar also will be exposed to this elongation or compression, which causes a change of the magnetic properties of the strips 4 As a consequence thereof also the magnitude of the current induced in the coil 6 will be changed. The change of the signal thus obtained from the coil 6 accordingly will be caused by a stress in the bar 1 and thus in the amorphous strips 4 and will be proportional to the stress.

If the bar 1 is exposed to a stress in the axial direction also a corresponding stress in the amorphous strips 4 will be obtained. This will be demonstrated by a change in the signal from the coil 6 such change being proportional to the stress.

If the bar 1 is exposed to a bending moment in a plane perpendicular to the plane of the figure, the amorphous strips on one said of the bar will be exposed to an elongation and on the diametrically opposite side to a compression providing a change of the magnetic properties of the strips. The signal obtained in the coil 6 will then be changed in dependence on the magnitude of the bending stress, and the difference thus will demonstrate the bending stress to which the bar is exposed in said direction.

The simple embodiment of the invention described above thus allows measuring of stresses to which the bar is exposed irrespective of the stresses being generated by a torque, an axial force or a bending moment in a certain indicated direction. The simple embodiment shown in FIGS. 1 and 1A has the shortcoming that a bending moment in the plane of the figure will not generate an appreciable stress in the amorphous strips influencing the pick-up coil 6 and, therefore, no appreciable change of the magnetic properties of said strips will be obtained. Influences in the pick-up coil 6 from strips, which under the influence of said bending moment is subject to stresses, will balance each other since said stresses have opposite signs. No appreciable change of the signal received from coil 6 will thus be obtained under the influence of a bending moment in the plane of the figure. In spite of said disadvantage this simple embodiment can be used in such cases wherein the loads to which the bar may be exposed, can be definitely foreseen and wherein bending in a predetermined direction can be completely excluded and there is no need of knowing the art of the load on the bar, which has initiated the detected stress.

Figure 2:
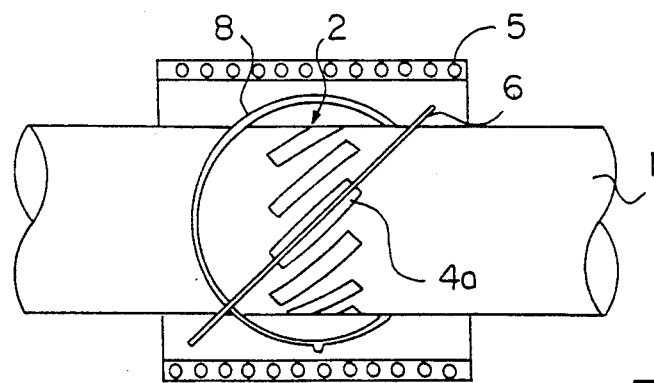
FIG. 2 shows diagrammatically a modification of the embodiment of FIG. 1 wherein two pick-up coils are used.
Figure 2A:
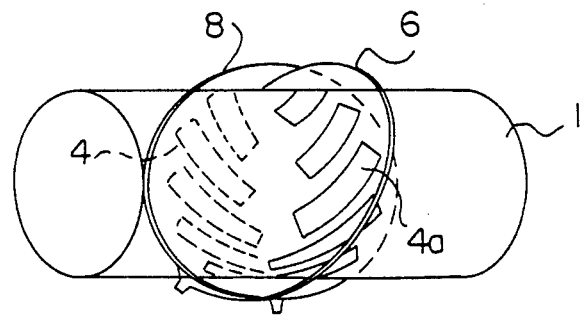
FIG. 2A is a perspective view of the bar-shaped body shown in FIG. 2 and the two pick-up coils encircling the bar.

FIGS. 2 and 2A illustrate an embodiment wherein the bar 1 is provided with a single zone 2 only having strips of amorphous magnetoelastic material. This embodiment differs from the embodiment of FIGS. 1 and 1A only by the fact that there is associated with the strip zone 2 a further pick-up coil 8 located in a plane which includes an angle of 90° with the plane of the pick-up coil 6, the pick up coil 8 being rotated 90° peripherally in relation to the pick-up coil 6. By means of the pick-up coil 8 stresses in the strips are sensed in a plane including 90° with the corresponding sensing plane of the pick-up coil 6. If the bar 1 is exposed to a bending moment acting in a plane perpendicular to the plane of the figure, the signal from the pick-up coil 6 will be affected in the manner described with reference to FIGS. 1 and 1A. If the bar 1 is exposed to a bending moment acting in the plane of the figure the signal from the pick-up coil 8 will be affected in a corresponding manner. If the bending moment acts in an intermediate plane, an influence, split into components, will result in the two pick-up coils 6 and 8. Stresses caused by torques or forces in the axial direction of the bar 1 affect equally the signals from each of the pick up coils 6 and 8.

The embodiment shown in FIGS. 2 and 2A guarantees measurement of stresses in the bar irrespective of such stresses being generated by torque, axial force or bending moment and irrespective of the direction of the bending moment.

Although it is not possible to decide in the simple embodiments shown in FIGS. 1, 1A and 2, 2A if the stresses measured are generated by a torque, an axial load or a bending moment, the stresses measured nevertheless can be used for controlling the parameters producing the load in question. E.g., if the bar 1 comprises a drive shaft or a tool or the like e.g. feed rate, drive power supplied, etc can be controlled on the basis of the information obtained as to existing stresses in the bar, and thus overloading of the shaft or the tool or a workpiece actuated upon by the tool can be prevented.

A very important feature of the present invention is that the pick-up coil or coils are arranged such that the magnetosensitive axis or axes of the coils include an acute angle, preferably 45°, with the axis of the bar. In the embodiment of FIGS. 1, 1A and 2, 2A the pick-up coils 6 and 8 are located in planes inclined at 45° to the axis of the bar. Inclination of the magnetosensitive axes of the coils is a prerequisite for the possibility to measure safely, already by means of the simple embodiments described with reference to FIGS. 1, 1A, 2, 2A all stresses in the bar surface, which generate an elongation or contraction, irrespective of the stress being caused by torque, bending moment or axial force. The arrangement of the magnetosensitive axes of the pick-up coils in an acute angle, preferably 45°, to the axes of the bar moreover is a prerequisite for the development of the device of the invention, which is illustrated in FIGS. 3, 3A-C, illustrating a preferred embodiment of the invention, which guarantees not only measurement of torsion stresses, bending stresses and axial stresses in the bar surface but also provides distinction between the stresses. Thus, by means of the device shown diagrammatically in FIGS. 3, 3A-C bending stress, torsion stress and axial stress can be measured separately. By constructing the measurement unit as a signal processing unit according to the block diagram of FIG. 3D there is also obtained a simultaneous presentation of the stresses of different kinds to which the bar is exposed. The preferred illustrative embodiment will be described below.

In the preferred embodiment of FIGS. 3, 3A, 3B, 3C the bar is provided in two zones 2 and 3 separated from each other with a number of thin strips 4 of an amorphous magnetoelastic material, which are uniformly distributed along the circumference in the peripheral direction. In a manner corresponding to that described with reference to FIG. 1 the strips are glued, welded or sputtered to the surface of the bar 1. The strips 4 extend along the periphery at a pitch the pitch angle of which is substantially 45° the pitch direction in one zone 2 being opposite to the pitch direction in the other zone 3. Two pick-up coils 6 and 7 are associated with the zone 2, which are located outside the bar 1 and encircle said bar. The pick-up coils 6 and 7 extend in planes which are perpendicular to each other and includes about 45° with the axis of the bar 1. Accordingly, a strip 4 on the bar extends substantially perpendicularly to the plane of the coil 6, the diametrically opposite strip extending substantially in the plane of the coil. The strips considered as extending substantially normal to the plane of the pick-up coil 6 accordingly affect the current in the coil while the strip extending substantially in the plane of the coil does not affect said current.

In a corresponding manner pick up coils 12 and 13 are associated with the zone 3 but these coils are displaced in the peripheral direction by rotation about 90° in relation to the two coils 6 and 7. By this arrangement stresses in strips 4 located in two planes perpendicular to each other, thus will be measured, which guarantees that bending stresses can be detected irrespective of the plane wherein the bending moment acts.

As in the embodiments of FIGS. 1 and 2 an excitation coil 5 is provided outside the bar, said coil extending axially in relation to the bar 1 and encircling the strip zones 2 and 3 as well as the pick-up coils 6, 7 and 12, 13. The excitation coil 5 can be connected to a drive unit 15 to generate a magnetic field over the pick-up coils and the strip zones. The pick-up coils 6, 7, 12, 13 are connected to a measuring unit 16 for indicating the signals generated in the coils FIG. 3A is a circuit diagram showing diagrammatically the interconnection of the coils for indicating torsion stresses only in the bar 1. The pick-up coils 6 and 7 which sense the strip zone 2 thus are connected in series in phase. The coils 12 and 13 sensing the strip zone 3, which are rotated 90° in relation to the coils 6 and 7, also are connected in series in phase. The two coil packages 6, 7 and 12, 13, respectively, are connected in series and in opposition.

If there is no load on the bar 1 when the excitation coil 5 is fed with AC current from the drive unit 15 signals I of the same magnitude will be obtained in all pick-up coils, i.e. the signals $I_6$, $I_7$, $I_{12}$ and $I_{13}$ in the coils 6, 7 and 12, 13, respectively, and accordingly $I_6 = I_7 = I_{12} = I_{13}$.

Since the coils 12, 13 are connected in series in opposition to the coils 6, 7, the following relationship is obtained:

$$I_{12} + I_{13} - (I_6 + I_7) = 0$$

Thus, when there is no load on the bar 1 a zero output signal will be obtained.

If the bar 1 is exposed to a torque of such direction that the strips of the strip zone 2 will be elongated and the strips in the strip zone 3 will be compressed, signal I generated by the excitation coil 5 in the pick-up coils will be increased by (+δI) under the influence of the strips exposed to an elongation, the signal I being decreased by (−δI) under the influence of the strips exposed to a compression.

This gives the following result $$I_{12}-\delta I+I_{13}-\delta I-(I_6+\delta I+I_7+\delta I)=-2\delta I-2\delta I=-4\delta I$$

The resulting output signal thus will be −4 δI. This signal accordingly is proportional to the torsion stress to which the bar 1 is exposed, and the sign of the signal also indicates the direction in which the loading torque acts.

In the equations referred to in the following description of the illustrative embodiments there will be used for simplification only the terms I and δI and not the complete expressions for these terms because the result will be the same.

If the torque acts instead in the opposite direction, the following relationship thus will be obtained:

$$I_{12}+\delta I+I_{13}+\delta I-(I_6-\delta I+I_7-\delta I)=+4\delta I.$$

The resulting output signal accordingly will be 4 δI, and the sign of the output signal indicates the direction in which the loading torque acts.

Figure 3:
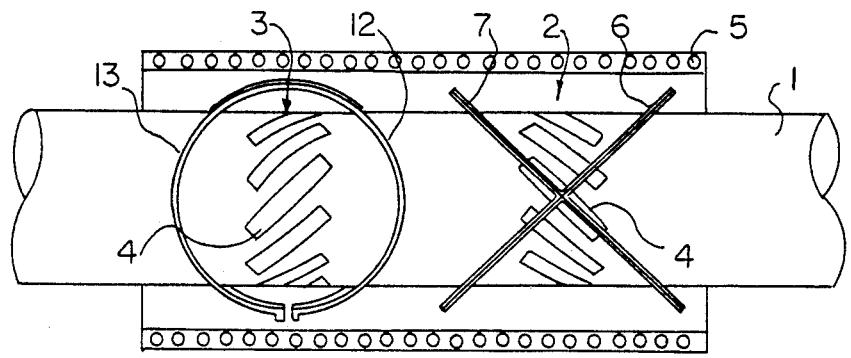
FIG. 3 shows a preferred embodiment of the device of the invention having two strip zones the pick-up coils in one zone being rotated 90° in relation to the other strip zone.
Figure 3A:
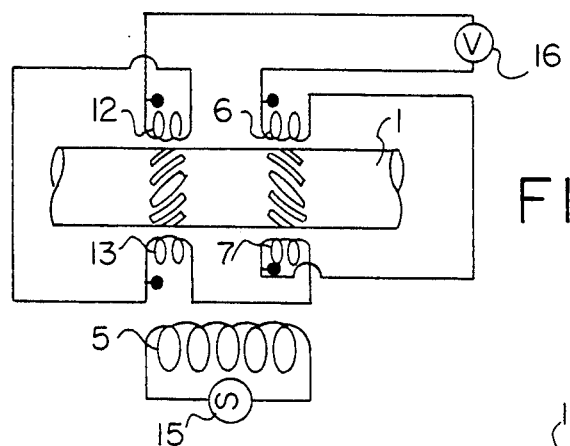
FIGS. 3A, 3B and 3C show diagrammatically the interconnection of the pick-up coils in three different manners for measuring separately torsion stresses (FIG. 3A), bending stresses (FIG. 3B) and axial stresses (FIG. 3C)

If the connection of the coils according to FIG. 3A is maintained for measuring torsion stresses and the bar 1 is exposed to a bending moment in a plane perpendicular to the plane of FIG. 3, e.g. so that the strip 4 shown by solid lines in the strip zone 2 will be elongated and the diametrically opposite strip will be compressed, the signal $I_7$ will be increased by δI and the signal in the coil 6, $I_6$, will be decreased by δI. The signals in the pick-up coils 12 and 13 rotated 90° in relation to the pick up coils 6 and 7, will not be affected. Thus, the following relationship will be obtained:

$$I_{12}+I_{13}-(I_7-\delta I+I_6-\delta I)=0$$

The resulting output signal accordingly will be zero.

The same result will be obtained if the bending moment acts in the opposite direction and also if the bending moment acts instead in the plane of FIG. 3.

If the coils are connected for measuring torsion stresses and the bar 1 is exposed to a bending moment there will be obtained no output signal as a consequence thereof.

If the connection of the coils is maintained for measuring torsion stresses, and the bar 1 is exposed to an axial load all strips 4 in the strip zones 2 and 3 will be exposed to an elongation or a compression, respectively depending on the axial load being a tension load or a compressive load. The signals I in each of the pick-up coils 6, 7 and 12, 13, respectively, thus either will be increased by δI or will be decreased by δI. Since the coils 6, 7 and 12, 13 are connected in series in opposition the resulting output signal will be zero Even if the bar 1 is exposed to an axial load no output signal depending thereon will thus be obtained.

Figure 3B:
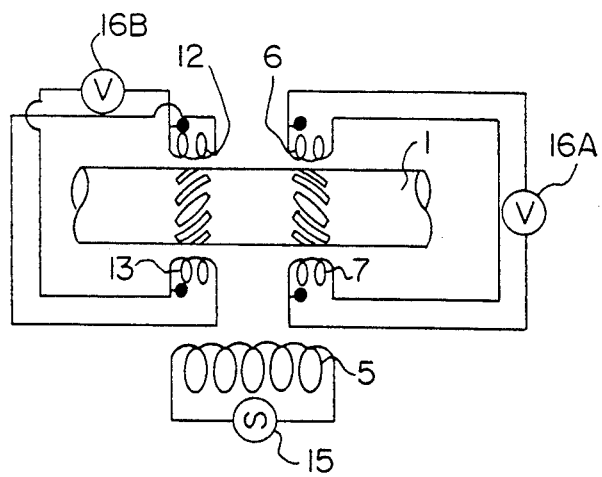

FIG. 3B discloses a circuit diagram for interconnection of the coils when bending stresses only in the bar 1 are to be indicated. The coils 6 and 7 then are connected in series in opposition over the strip zone 2 and are connected to a separate measuring unit 16A. The coils 12 and 13 over the strip zone 3 in the same manner are connected in series and in opposition and are connected to a separate measuring unit 16B.

If there is no load on the bar 1 when the excitation coil 5 is energized over the drive unit 15 equal signals are obtained in the coils 6, 7 and 12, 13, respectively. Since the coils 6, 7 and 12, 13, respectively, are connected in series in opposition a zero output signal will be obtained from the coils 6, 7 as well as the coils 12, 13. The following signal pattern thus will be obtained:

$$I_6-I_7=0,\ I_{12}-I_{13}=0$$

When there is no load on the bar 1 the output signal from each pair of pick-up coils 6, 7 and 12, 13, respectively, thus will be zero.

If the bar 1 is exposed to a bending moment acting in a plane perpendicular to the plane of FIG. 3 so that the strip 4 shown by solid lines in FIG. 3 will be exposed to a compression and the diametrically opposite strip will be exposed to an elongation, the following relationship will be obtained:
for the coils 6, 7: $I_6+\delta I-(I_7-\delta I)=+2\delta I$;
for the coils 12, 13: $I_{12}-I_{13}=0$.

If the bending moment acts in the same plane but instead in the opposite direction, there will be obtained:
for the coils 6, 7: $I_6-\delta I-(I_7+\delta I)=-2\delta I$;
for the coils 12, 13: $I_{12}-I_{13}=0$ If the bar 1 instead is exposed to a bending moment acting in the plane of the figure so that the strip influencing the coil 12 will be elongated and the strip influencing the coil 13 will be compressed, there will be obtained
for the coils 12, 13: $I_{12}+\delta I-(I_{13}-\delta I)=+2\delta I$
for the coils 6, 7: $I_6-I_7=0$.

If the bending moment acts in the same plane but in the opposite direction there will be obtained
for the coils 12, 13: $I_{12}-\delta I-(I_{13}=\delta I)=-2\delta I$
for the coils 6, 7: $I_6-I_7=0$.

Thus, it will be seen that a bending moment generates a positive or negative output signal the magnitude of which is proportional to the magnitude of the bending stress. By observing which coil package, the coils 6, 7 or the coils 12, 13 the signal is obtained from, also information on the plane, in which the bending moment acts, will be obtained the sign of the signal furthermore providing information on the direction in the related plane in which the bending moment acts.

If the coils 6, 7 and 12, 13 are connected for measuring bending stresses but the bar is exposed to a torque, the strips 4 in one strip zone will be elongated and the strips in the other strip zone will be compressed depending on the direction of the torque. An elongation in one strip thus will cause the signal I to be increased by δI, and if the strip is compressed the signal I will be decreased by δI. Thus, there will be obtained
if the strips in the strip zone 2 are elongated
for the coils 6, 7: $I_6=\delta I-(I_7=\delta I)=0$
for the coils 12, 13: $I_{12}-\delta I-(I_{13}-\delta I)=0$
If the strips in the zone 2 are compressed:
for the coils 6, 7: $I_6-\delta I-(I_7-\delta I)=0$
for the coils 12, 13: $I_{12}=\delta I-(I_{13}=\delta I)=0$ If the coils 6, 7 and 12, 13 are connected for measuring bending stresses only, a torque in the bar will not affect the output signal.

If the coils 6, 7 and 12, 13 are connected for measuring bending stresses and the bar 1 is exposed to an axial load, there will be obtained an elongation or a compression of the strips 4 depending on the axial load being a tension load or a compressive load.

Figure 3C:
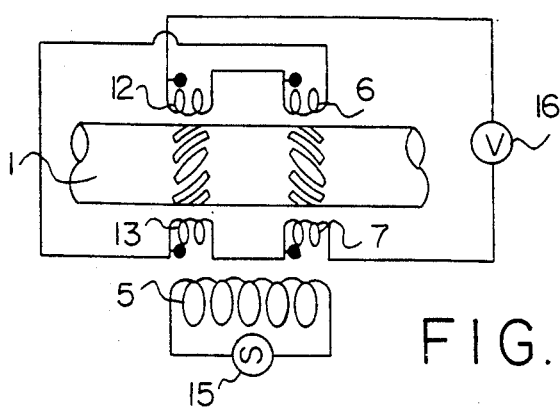

In case of tension load there will be obtained for the coils 6, 7: $I_6 + \delta I - (I_7 = \delta I) = 0$ for the coils 12, 13: $I_{12} = \delta I - (I_{13} = \delta I) = 0$ In case of pressure load there will be obtained for the coils 6, 7: $I_6 - \delta I - (I_7 - \delta I) = 0$ for the coils 12, 13: $I_{12} - \delta I - (I_{13} - \delta I) = 0$ Thus, it will be seen that if the coils 6, 7 and 12, 13 are connected for measuring bending stresses, an axial load in the bar will not affect the output signal. FIG. 3C discloses a circuit diagram for interconnection of the coils 6, 7, 12, 13 when axial stresses only are measured. The coils 6, 7, 12, 13 then are interconnected in series and in phase and are connected to a common measure unit 16 as will be seen from FIG. 3C.

If there is no load on the bar 1 and the excitation coil 5 is energized via the drive unit 15 an output signal will be obtained in the measuring unit 16, which equals the sum of the signals generated in each of the coils 6, 7, 12, 13, i.e. the output signal will be $I_6 + I_7 + I_{12} + I_{13}$.

If the bar 1 is exposed to an axial load there will be obtained at tension load: $I_6 + \delta I - I_7 + \delta I + I_{12} + \delta I + I_{13} + \delta I = I_6 + I_7 + I_{12} + I_{12} + 4 \delta I$ At compressive load: $I_6 - \delta I + I_7 - \delta I + I_{12} - \delta I + I_{13} - \delta I = I_6 + I_7 + I_{12} + I_{13} - 4 \delta I$ When the bar is exposed to an axial load the output signal accordingly will be increased or decreased as compared with the magnitude of the output signal when there is no load on the bar. The magnitude of this increase or decrease is depending on the size of the axial load, and an increase of the output signal means that the load is a tension load, while a decrease of the magnitude of the output signal means that the load is a compressive load.

If the coils 6, 7, 12, 13 are connected for measuring axial stresses and the bar is exposed to a torque, there will be obtained an elongation of the strips in one strip zone and a compression of the strips in the other strip zone. Since the coils 6, 7, 12, 13 are connected in series the following relationship will be obtained if the torque generates an elongation of the strips in the strip zone 2 and a compression of the strips in the strip zone 3:

$$I_6 + \delta I + I_7 + \delta I + I_{12} - \delta I + I_{13} - \delta I = I_6 + I_7 + I_{12} + I_{13}$$

An output signal will accordingly be obtained having the same magnitude as the output signal obtained when there is no load on the bar, i.e. torsion stresses in the bar 1 accordingly will not affect the output signal.

If the torque instead causes a compression of the strips 4 in the strip zone 2 and an elongation of the strips in the strip zone 3 there will be obtained $$I_6 - \delta I + I_7 - \delta I + I_{12} + \delta I + I_{13} + \delta I = I_6 + I_7 + I_{12} + I_{13}$$

Accordingly, the output signal will not be affected by a torsion stress in the bar 1 irrespective of the direction of the torque.

If the coils 6, 7, 12, 13 are connected for measuring axial stresses and the bar 1 is exposed to a bending moment in a certain direction in a plane perpendicular to the plane of the figure, the strip 4 in the strip zone 2 influencing the coil 6, will be elongated, the diametrically opposite strip in said zone being compressed.

The strips in the strip zone 3 influencing the coils 12 and 13 then will be exposed to no elongation or compression, respectively.

The signal generation in the coils 6, 7, 12, 13 will be as follows:

$$I_6 + \delta I + I_7 - \delta I + I_{12} + I_{13} = I_6 + I_7 + I_{12} + I_{13}$$

The bending stress accordingly will not affect the output signal.

If the bending moment acts in the same plane but in the opposite direction there will be obtained $$I_6 - \delta I + I_7 + \delta I + I_{12} + I_{13} = I_6 + I_7 + I_{12} + I_{13}$$

Irrespective of the direction of the bending moment in the plane the output signal will not be affected.

If the bending moment instead acts in the plane of FIG. 3 so that the strip influencing the coil 12 is exposed to an elongation and the strip influencing the coil 13 is exposed to a compression, and the strips in the strip zone 2 influencing the coils 6 and 7 then are not exposed to tension or compression, there will be obtained $$I_6 + I_7 + I_{12} + \delta I + I_{13} - \delta I = I_6 + I_7 + I_{12} + I_{13}$$

The bending moment thus does not affect the output signal.

If the bending moment acts in the same plane but such that the strip in the strip zone 3 influencing the coil 12 will be compressed while the strip influencing the coil 13 will be elongated, the following relationship will be obtained:

$$I_6 + I_7 + I_{12} - \delta I + I_{13} + \delta I = I_6 + I_7 + I_{12} + I_{13}$$

The bending moment in the bar 1 irrespective of the sign or direction thereof thus will not affect the output signal.

If the coils 6, 7, 12, 13 thus are interconnected for measuring axial stresses only as shown in FIG. 3C, torsion stresses or bending stresses to which the bar 1 is exposed, will not affect the output signal.

If it is desired to obtain a zero output signal also when measuring axial stresses, when the bar is not exposed to a load, it is possible to provide within the operational area of the excitation coil 5 but outside the zones 2 and 3 a further coil (not shown in the figure) encircling the bar and to connect this further coil in series in opposition to the other pick-up coils. At the excitation by means of the excitation coil 5 a signal will be generated in this extra coil. By proper adjustment of the number of windings the coil is constructed such that it will generate an output signal which equals the output signal generated in the pick-up coils 6, 7, 12. 13 connected in opposition when there is no load on the bar 1. The resulting output signal when there is no load on the bar 1 accordingly will be zero.

Figure 3D:
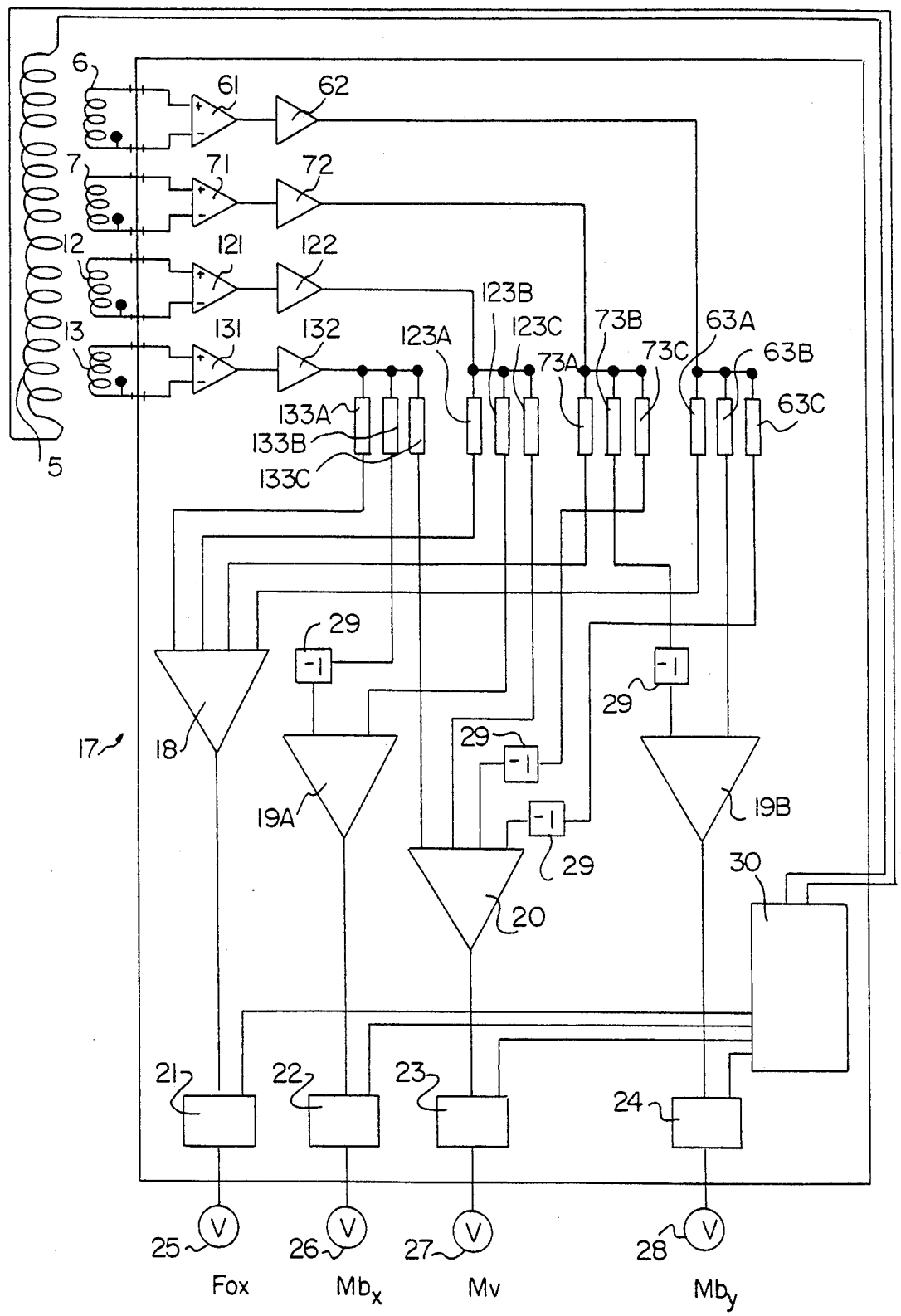
FIG. 3D is a block diagram of a signal processing unit allowing simultaneous presentation of the different types of stresses to which the bar is exposed.

FIG. 3D discloses a block diagram for a signal processing unit 17 enclosed in a housing, which allows simultaneous presentation of the stresses of different kinds, to which the bar is exposed.

Each of the pick-up coils 6, 7, 12, 13 is connected to a differential amplifier 61, 71, 121, 131, respectively, included in the signal processing unit 17, each amplifier having a buffer 62, 72, 122, 132, respectively, connected to the output side thereof. The signal from each of said differential amplifiers with the connected buffer is supplied to three resistors 63A-C, 73A-C, 123A-C and 133A-C, respectively, which are of the same size. The signal from each pick-up coil accordingly will be separated in the signal processing unit 17 into three commensurate signals, which allows signal processing for simultaneous indication of existing axial stresses, bending stresses and torsion stresses.

For this purpose the signal processing unit 17 includes four integrators 18, 19A, 19B and 20. The output of each integrator is connected to a demodulator 21, 22, 23 24, respectively, the output signals of which are supplied to a measuring instrument 25, 26, 27, 28, respectively, said instruments each indicating the resulting signal.

In the integrator 18 the signals are processed for indicating existing axial stresses. The resistors 63A, 73A, 123A and 133A thus are connected to the integrator 18 in which the signals are added to each other. The resulting signal in the measuring instrument 25 then provides information on the existing axial stress condition in the bar.

In the integrator 19A signals relating to the pick-up coils 12 and 13 are processed for measuring existing bending stresses generated by a bending moment in a plane ($Mb_x$). The resistor 123B thus is connected via a conduit directly to the integrator 19A. and the resistor 133B is connected to the integrator 19A via an inverter 29. The resulting signal in the measuring instrument 26 then corresponds to bending stresses generated by a bending moment ($Mb_x$) in said plane.

In a corresponding manner the resistor 63B is connected directly via a conduit to the integrator 19B, and the resistor 73B is connected to the integrator 19B via an inverter 29. The resulting signal in the measuring instrument 28 then corresponds to bending stresses caused by a bending moment ($Mb_y$) in a plane perpendicular to the plane previously mentioned.

In the integrator 20 the signals are processed for indicating existing torsion stresses. The resistors 63C and 73C each are connected to the integrator 20 via an inverter 29, and the resistors 123C and 133C are connected directly via conduits to the integrator 20. The resulting signal in the measuring instrument 27 corresponds to the torsion moment for which the bar is exposed.

The signal processing unit 17 also comprises an oscillator 30 which is connected to the excitation coil 5 to drive said coil, also the demodulators 21, 22, 23 and 24 on the input side being connected to the oscillator 30.

In the signal processing unit 17 constructed in the manner described above the pick-up coils 6, 7, 12 and 13 thus are connected for measuring axial stresses, bending stresses in two planes perpendicular to each other, and torsion stresses as has been described with reference to FIGS. 3A–C, simultaneous indication of the existing kinds of stresses being provided Thus, no manual or stepwise switching of the coils for measuring stresses of the different kinds is necessary.

Figure 4:
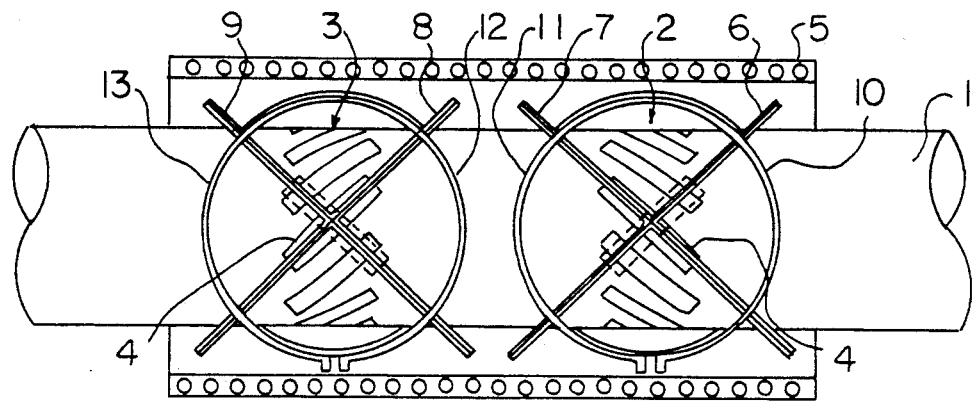
FIG. 4 shows diagrammatically an illustrative embodiment with two strip zones and four pick-up coils associated with each strip zone.

In FIG. 4 a further illustrative embodiment is disclosed, which differs from the embodiment of FIG. 3 by four pick-up coils being associated with each strip zone 2, 3. Thus, the pick-up coils 6, 7, 10, 11 are associated with the zone 2. However, the coils 10 and 11 are rotated in relation to the coils 6 and 7 so that the intersections of the coils 10 and 11 are displaced peripherally about 90° in relation to the intersections of the coils 6 and 7. In a corresponding manner the pick up coils 8, 9, 12, 13 are associated with the zone 3 However, the coils 8 and 9 are rotated in relation to the coils 12 and 13 so that the intersections of the coils 8 and 9 are displaced peripherally about 90° in relation to the intersections of the coils 12 and 13. The stress in four regions displaced 90° in relation to each other peripherally accordingly is measured.

When measuring bending stresses generated by a torque acting perpendicularly to the plane of the figure, the coils 7 and 8 are connected in series in phase as are the coils 6 and 9, the two coil systems being connected in series in opposition. The resulting output signal then corresponds to the stress generated by the bending moment in said plane. In order to measure bending stresses generated by a bending moment acting in the plane of the figure the coils 10 and 13 are connected in series in phase as are the coils 11 and 12, the two coil systems being connected in series in opposition. The resulting output signal corresponds to a bending stress generated by a bending moment in said plane.

When torsion stresses are measured the coils 6, 7, 10, 11 are connected in series in phase as are the coils 8, 9, 12, 13, the two coil systems being connected in series in opposition. A resulting output signal then corresponds to the torsion stress in the bar 1 as to magnitude and direction.

When axial stress is measured all coils are connected in series in phase, a condition without load on the bar 1 providing a signal of a certain magnitude. If the bar 1 is exposed to an axial load, this signal will increase or decrease depending on the axial stress being a tension stress or a compressive stress.

By arranging an extra pick-up coil as described with reference to FIG. 3C compression can be obtained such that the output signal in a condition without load will be zero also when axial stresses are being measured.

The connection of the coils and the coil systems, respectively, in the embodiment of FIG. 4 will not be described and illustrated in more detail here. However, the connection can be made principally in the same manner as illustrated and described in detail with reference to FIGS. 3A–3C.

Figure 5:
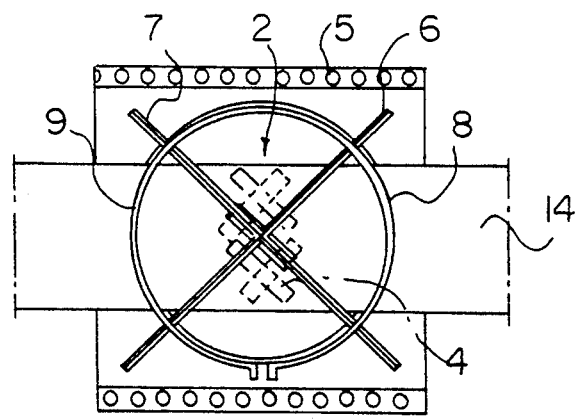
FIG. 5 shows diagrammatically a device of the invention for non-contact measuring of bending stresses in a bar-shaped body of square cross-sectional shape.

The illustrative embodiment of FIG. 5 illustrates an embodiment which is particularly suited for measuring bending stresses It is assumed that the bar 14 has e.g. a square cross-section and is provided with one zone 2 only with strips 4. The strips 4 are affixed in corresponding manner as previously described but in this case extend rectilinearly substantially 45° to the axis of the bar 14 and are arranged in a corresponding manner at each of the four sides of the bar. The pick-up coils 6 and 7 are located in planes which are perpendicular to each other and include substantially 45° with the axis of the bar 14. In the example shown in the figure there are also provided two further coils 8 and 9 which are rotated, however, 90° in relation to the first mentioned pair of pick up coils 6, 7.

When bending stresses generated by a bending moment in an axial plane perpendicular to the plane of the figure, are measured the coils 6 and 7 are connected in series in opposition, a bending stress in the bar generating an output signal. When bending stresses generated by a bending moment in the plane of the figure, are measured the coils 8 and 9 are connected in series in opposition, a bending stress generating an output signal.

When axial stresses are measured all coils are connected in series in phase in the manner described with reference to the illustrative embodiments previously described.

As will be seen from the embodiments described the invention allows elongation or compression in the surface of the bar to be measured, e.g. the stresses can be measured irrespective of the stresses being generated by a torsion moment, a bending moment or an axial force, already when only one zone with strips is used. The signal generated in the coil or coils is an expression of the magnitude of the elongation or compression.

As can also be seen from the illustrative embodiments described it is also possible to differ between the stresses to which the bar is exposed, by providing two strip zones and connecting the pick-up coils provided by the invention in accordance with three different connecting patterns. Thus, torsion stress, bending stress and axial stress in the bar can be separately measured.

The principles according to which the pick-up coils are interconnected for separately measuring stresses of the different kinds then are as follows.

When bending stresses are measured the pick-up coils are connected so that signals generated by diametrically opposite strips are added to each other with negative signs.

When torsion stresses are measured, the coils are connected so that signals generated by strips in one strip zone are decreased by signals generated by strips in the other strip zone.

When axial stresses are measured all signals are added to each other from strips in both strip zones.

In the described illustrative embodiments the amorphous strips are mounted to the surface of the bar 1 with a pitch angle which is preferably 45° the pick-up coils being arranged so that the magnetosensitive axis of each coil includes 45° with the axis of the bar A plane through a pick-up coil then includes also 45° with the axis of the bar. The basic inventive effect will also be achieved, however, albeit to a reduced degree, if the strips are arranged on the bar at another acute pitch angle, e.g 30°. Then, the pick-up coils preferably are arranged in relation to the associated strip zone such that the magnetosensitive axes of the coils include a positive or negative, respectively, acute angle with the axes of the bar, substantially corresponding to the pitch angle of the strips, i.e. substantially ±30° if the pitch angle of the strips is 30°. Then the coils extend in planes which include ±60° with the axis of the bar. By such an embodiment it is achieved that the longitudinal dimension of the device will be reduced, which can be of value if the available space for mounting the device is small and a reduction of the strength and distinctiveness of the signals can be accepted.

The invention which has been described above with reference to the illustrative embodiments shown in the figures, is not limited to such embodiments but can be modified within the scope of the following claims. E.g. it is conceivable to let the pick-up coils also form excitation coils, the specific excitation coil 5 being eliminated. Moreover, it may be possible to utilize in some applications the earth magnetic field, also in this case the need of specific excitation coils being eliminated. In the illustrative embodiments described and shown zones are arranged around the bar, including strips of an amorphous magnetoelastic material uniformally distributed in peripheral direction, said strips being affixed to the periphery surface with a pitch of preferably 45°. Alternatively the bar can be provided in said zones with a coating of an amorphous magnetoelastic material wherein the magnetic dipoles are oriented substantially in a direction extending at a pitch angle along the circumferential surface of the zone, preferably at the pitch angle 45°.

We claim:

1. Device for non-contact measuring of stresses in a bar-shaped body having an axis, wherein the bar has at least one transverse zone (2, 3) which is provided with a coating of an amorphous magnetoelastic material in which the magnetic dipoles are oriented along the circumferential surface of said zone substantially in a direction extending at an angle with respect to said axis, said surface coating consisting of a plurality of thin strips(4) being affixed to the circumferential surface of said zone and extending at said angle therealong, and wherein means for generating a magnetic field are provided for in influencing said zone (2, 3) and a pick-up coil (6, 13) encircling the bar is provided for said zone (2, 3), said pick-up coil (6, 13), being connected to a measuring unit (16, 16A) for indicating signals generated in the pick-up coil (6, 13), characterized in that said pick-up coil (6, 13) encircling the bar (1), which is associated with said zone (2, 3), is oriented in relation to the bar (1) in such a manner that the magnetosensitive axis of the pick-up coil forms an acute angle with said axis of the bar(1) in said zone (2, 3).

2. Device as claimed in claim 1, wherein the bar includes two zones (2, 3) spaced axially from each other and each zone is provided with said coating strips (4), said angle of said strips in each of said two zones (2, 3) being about 45° with the pitch direction in one zone (2) being opposite to the pitch direction in the other zone (3), and wherein at least two pick-up coils (6, 7; 12, 13) are associated with each of said zones (2, 3) and are so oriented in relation to said bar (1) that the magnetosensitive axis of one coil (7) includes a positive acute angle with said axis of said bar (1), and the magnetosensitive axis of the other coil (6) includes a negative acute angle with said axis of said bar (1), the magnitude of each of said acute angles substantially corresponding to the angle for the direction of the strips (4) in said zones (2, 3).

3. Device as claimed in claim 2 wherein said means for generating a magnetic field comprises an excitation coil (5) which can be connected to a drive source, said coil (5) enclosing said zones (2, 3) and said strips (4) as well as said pick-up coils (6-13) inclusive.

4. Device as claimed in claim 3 having the pick-up coils (6-13) connected for separately measuring torsion stresses, bending stresses and axial stresses, respectively; wherein the coils are selectively connected as follows:
for measuring torsion stresses, in such a way that signals coming from one zone (2) are decreased by signals coming from the other zone(3);
for measuring bending stresses, in such a way that signals generated by diametrically opposite portions in the related zone are added to each other with negative sign; and
for measuring axial stresses, in such a way that all signals coming from both zones are added to each other.

5. Device as in claim 1 wherein the pick-up coils (6-13) are oriented such that the intersections of the pick-up coils of one zone (2) are displaced peripherally about 90° in relation to the corresponding intersections of the pick-up coils of the other zone (3).

6. Device as in claim 1 wherein four pick-up coils (6, 7, 10, 11; 8, 9. 12, 13) are associated with each of said zones (2, 3), the pick-up coils (6-13) for each zone being oriented such that the intersections of one pair of coils (6, 7) are displaced peripherally about 90° in relation to corresponding intersections of the other pair of coils (10, 11) in the same zone (2).

* * * * *